US007910560B2

(12) United States Patent
Carter

(10) Patent No.: US 7,910,560 B2
(45) Date of Patent: Mar. 22, 2011

(54) METHOD FOR INCREASING BREAST MEAT YIELD IN POULTRY

(75) Inventor: A. Franklin Carter, Laramy, WY (US)

(73) Assignee: Arkion Life Sciences LLC, Wilmington, DE (US)

( * ) Notice: Subject to any disclaimer, the term of this patent is extended or adjusted under 35 U.S.C. 154(b) by 634 days.

(21) Appl. No.: 10/838,427

(22) Filed: May 4, 2004

(65) Prior Publication Data
US 2005/0020513 A1    Jan. 27, 2005

Related U.S. Application Data

(60) Provisional application No. 60/469,230, filed on May 9, 2003.

(51) Int. Cl.
*A61K 31/7048* (2006.01)
*A61K 31/70* (2006.01)
*C07H 17/00* (2006.01)

(52) U.S. Cl. .............. 514/31; 514/25; 514/27; 536/6.5; 536/4.1

(58) Field of Classification Search .................... 514/31, 514/25, 27; 536/6.5, 4.1
See application file for complete search history.

(56) References Cited

U.S. PATENT DOCUMENTS

| 4,536,494 | A | * | 8/1985 | Carter | ............................ 514/31 |
| 4,600,706 | A | | 7/1986 | Carter | |
| 5,715,185 | A | * | 2/1998 | Carter | ............................. 705/7 |
| 5,985,845 | A | | 11/1999 | Carter | |
| 6,156,362 | A | | 12/2000 | Cirigliano et al. | |
| 2002/0146484 | A1 | | 10/2002 | Fidler et al. | |

* cited by examiner

*Primary Examiner* — Shaojia Anna Jiang
*Assistant Examiner* — Michael C Henry
(74) *Attorney, Agent, or Firm* — McCarter & English

(57) ABSTRACT

A method for increasing breast meat yield in avians by treating the poultry with an effective amount of natamycin. The effective amount of natamycin can be added to the avian's feed wither directly or in the form of a premix containing a carrier.

18 Claims, No Drawings

METHOD FOR INCREASING BREAST MEAT YIELD IN POULTRY

CROSS-REFERENCE TO RELATED APPLICATIONS

This application claims the benefit of U.S. Provisional Application No. 60/469,230, Filed May 9, 2003, the contents of which are incorporated herein by reference.

FIELD OF THE INVENTION

This invention relates to methods for increasing breast yield in poultry. More specifically, this invention relates to methods for increasing breast weight and yield in commercially grown poultry such as chickens and turkeys by administration of effective amounts of an anti-mycotic such as natamycin.

BACKGROUND OF THE INVENTION

Poultry production has changed greatly over the past ten years, becoming increasingly competitive with mergers resulting in fewer poultry companies throughout the world. On the other hand, during this same time period, per capita poultry consumption has continued to increase with companies becoming much more customer focused, marketing an ever-increasing array of fresh and value added products. The primary poultry breeders have also identified the need not only to grow their products faster and more efficiently but to provide more yield of the most valuable parts of the carcass, e.g. breast meat. Whether it is turkey or chicken broilers, the focus is on breast meat yield.

There has been considerable research looking at a variety of ingredients and nutrients which affect breast meat yield in today's high yield poultry. Inevitably, increasing breast meat yield requires a higher nutrient density and thus higher feed costs. Companies must then evaluate the cost-benefit ratio to make appropriate decisions.

In the current climate, where competition is fierce and every cost counts, maximizing the return from every part of the business is crucial. For broiler and turkey producers, increasing breast meat yield is a priority if full advantage is to be taken of its high market value in many countries.

Anti-mycotic materials are materials that inhibit mold, yeast, and fungal growth. One particular anti-mycotic is natamycin, one of the few anti-mycotics that has been approved as a food additive by the Food and Drug Agency of the U.S. government. Natamycin can be obtained commercially from, for example, Gist-Brocades Food Ingredients, Inc. (as Delvocide®) or Cultor Food Science (as Natanex®).

In view of the beneficial aspects of anti-mycotics, poultry feeds are treated with various anti-mycotics, such as natamycin, to prevent or inhibit certain conditions. For example, U.S. Pat. No. 4,600,706 sets forth a method for treating animal feed with natamycin to reduce or prevent fungal or mold growth. Similarly, natamycin has been incorporated into animal feed to improve animal feed efficiency (U.S. Pat. No. 4,536,494) and to reduce the incidence of the disease ascites (U.S. Pat. No. 5,985,845).

The prior art does not disclose, however, whether anti-mycotics such as natamycin have an effect on improving yield of specific and valuable parts of the carcass of turkeys and broilers. The present invention is thus directed to the finding that in fact natamycin has been found to have a positive affect on increasing breast meat yield in poultry.

SUMMARY OF THE INVENTION

The primary object of this invention is to provide a method for increasing breast meat yield in poultry, the method comprising treating the poultry with a breast meat yield-increasing amount of natamycin.

A secondary object of this invention is to provide a method for increasing breast meat yield in poultry, the method comprising adding a breast meat yield-increasing amount of natamycin to feed of the poultry.

The final object of this invention is to provide a method for increasing breast meat weight in poultry, the method comprising treating the poultry with a breast meat weight-increasing amount of natamycin.

DETAILED DESCRIPTION OF THE INVENTION

The present invention is based upon the finding that natamycin induces an increase in yield of breast meat of avians, and specifically, poultry. In particular, the inventors have determined that when natamycin is added to the feed of poultry, the result is poultry having increased breast meat. In fact, the increases in breast meat yield were found to be statistically significant over breast meat yield in poultry being fed feed not treated with natamycin. The term "avian" as used in this document, means an animal that is a member of the class Aves. Within the class Aves, domesticated fowl or poultry are preferred, but other members of this class include turkeys, ducks, and geese, among others.

Natamycin is an anti-mycotic also referred to as primarcin or tennectin. It is a creamy white, odorless, tasteless, practically insoluble crystalline amphoteric powder. It belongs to the polyene macrolide or macrocyclic lactone group of compounds. It is relatively stable when in a dry state or when mixed with dry diluents. The molecule, however, is sensitive to ultraviolet light, oxygen, or extreme pH values. It is relatively insoluble in water in which its solubility is of the order 0.005-0.010 weight/weight percent. Additionally, even in solutions, natamycin is rather unstable. Aqueous solutions of 6 mcg/ml of natamycin become microbiologically inactive after twenty-four hour exposure to light. Inactivation of natamycin by light, peroxides or oxygen proceeds at the fastest rate in solution or suspension. Natamycin is also sensitive to heavy metals, and may lose up to 75% of its effectiveness in four to five hours in their presence.

Natamycin has been applied to food products for a variety of uses, most notably, to reduce mold growth. It can be applied to the food products in several ways. It can be added in dry form to liquids, slurries, pastes and semisolids when adequate mixing can be accomplished, or the pure natamycin can be mixed with one or more of the dry ingredients and then added to a given food product. Solid foods requiring surface protection can be dipped, misted, fogged or dusted with a solution or suspension of natamycin. Additionally, natamycin may be incorporated homogeneously into the food itself.

Animal feed is largely composed of grain and cereal products, but may also include meat byproducts as a minor ingredient. Additionally, animal feed may include citrus pulp and grape hulls, either or both being present at less than about 5% by weight. Animal feed can also include added fats, vitamins and minerals, including riboflavin and trace metals.

Animal feed for feeding poultry includes protein, fat, fiber, calcium and phosphorous. A preferred feed would include corn and/or wheat, fat, meat meal, soybean meal, vitamins and minerals.

Animal feed is generally formed by cracking or grinding grain, rather than by incorporating the intact grain particles.

These ground or cracked particles in the feed are roughly 1/100 of the original grain size. Animal feeds are composed of many different particles, typically in a range between 1/32 of an inch, or less, to 1/8 of an inch in diameter. Additionally, the cracking process exposes higher moisture and different nutrient concentrations than are typically present at the surface of the grain particle, which usually has a hull or other coating. Thus, the increased moisture content of conventional feeds may decrease the stability of natamycin according to the literature in this art.

Feed is also generally exposed to light during its manufacture. It is thereafter typically stored in dark bins with lids to keep out moisture. The moisture content of the feed, however, ranges from 10-30%. Additionally, in use, uneaten leftover feed is thoroughly exposed to light, as it is retained in the pans that are typically found in automated feed systems. Thus, some feed may be retained for a week or more before it is consumed in an environment of high moisture and with exposure to ultraviolet and visible light rays, again potentially decreasing the stability of natamycin added thereto.

It was thus surprising to find that when natamycin was added to poultry feed, it had a statistically significant effect on breast meat yield, even when feed containing the natamycin underwent lighting and moisture conditions similar to that described above.

When used in poultry feed, in a preferred formulation, natamycin is initially mixed into a premix. The term "premix" is intended to mean a feed composition that is prepared as an initial mix containing the active ingredient and, for example, a carrier, and is then blended into the final feed. In the present invention, it is generally suggested, for ease of calculation, that one pound of the premix is blended with about one ton of conventional feed, with the result that the necessary dosage requirements of the natamycin are provided to the poultry to induce significant increases in breast yield. The premix of the invention preferably comprises about 2 to 25, and more preferably, about 5 to 20, grams of natamycin per pound of a carrier and most preferably about 10 grams of natamycin per pound of carrier. While the preferred carrier for use in the invention is calcium carbonate, virtually any other carrier can be used for purposes of forming a premix. Carriers for use in a premix, are well known by those having skill in the art, and appropriate concentrations can be readily determined. Some examples include rice hulls, walnut shells, zeolite, bentonite, and silica dioxides, to name a few.

The natamycin may be added to the carrier as a dry powder or as a liquid solution or suspension. When added as a liquid, the natamycin may be dissolved or suspended in a liquid with stirring at room temperature in about five minutes by adding about 2 to 25 grams of, for example, natamycin crystals to an appropriate solution, such as propylene glycol or methanol, or any other solvent in which natamycin will dissolve or be suspended. Because of natamycin's limited solubility, it usually will not completely go into solution, but may form a suspension. An optional volume for suspending 2 to 25 grams of natamycin is approximately 30 to 60 mL of an appropriate solution. Preferably, such an amount of natamycin is then added to about one pound of a conventional premix, and will not overly wet it. Once the premix is prepared, the premix is then added to the final feed, preferably at a rate in the range of one-half pound to 10 pounds of premix to one ton of feed, and most preferably, one pound of premix per one ton of feed, to supply daily requirements of the natamycin for the poultry.

A preferred premix composition includes rice hulls because they are beneficial due to their relatively low price. Other premix materials, however, may be used, including minerals such as calcium carbonate (limestone), inert products such as soybean mill feed and corn cob fractions, and any other related premix materials. Those having skill in the art are familiar with products that function or serve effectively in premix mixes, and, as such, can determine which premix material best serves their purposes. Although not required, generally it is preferred that the premix materials comprise an inert substance or substances.

The natamycin solid or suspension can be added directly to the premix material, and then mixed. Mixing can be accomplished by any known means, such as by a standard horizontal or vertical blender. Mixing time will again vary depending upon the particular ingredients of the premix, and can take as long as is necessary to assure that the ingredients are thoroughly mixed. In the preferred embodiment, mixing of the premix takes approximately 5-20 minutes.

The premix is then incorporated into the feed to be fed to the poultry. In a more preferred embodiment, natamycin, in a dry powder form, is blended with the preferred carrier calcium carbonate to form the premix, and the premix is directly blended into the final feed.

While it is preferred that the natamycin be mixed with a premix material prior to incorporation into the finished feed, the appropriate amount of natamycin can alternatively be blended directly into the feed. The preferred additive range of natamycin in finished feed, whether added directly or via a premix, is about 0.000011 to 0.011 weight percent (about 0.1 to 100 grams per ton of feed); more preferably about 0.000055 to 0.0055 weight percent (about 0.5 to 50 grams per ton); even more preferably about 0.00022 to 0.0028 weight percent (about 2 to 25 grams per ton), and most preferably 0.00088 to 0.0017 weight percent (about 8 to 15 grams per ton). In a preferred embodiment, this amount of natamycin is prepared, as discussed above, and added to about one pound of premix carrier. While there is no evidence that use of the higher amounts would cause any toxicity problems in treated poultry, it will affect cost considerations. Because the premix generally will be added to one-ton charges of feed (as is common in the industry), the correspondence between one gram of natamycin added to the premix yields about 1 ppm concentration of natamycin in the feed (about 0.0001 weight percent). Thus, 10 grams of natamycin added to one pound of premix, which in turn is added to one ton of feed, yields about an 11 ppm effective natamycin concentration.

Feed is conventionally prepared in a large bin or mixer in which the feed ingredients are added in descending weight order according to their prevalence in the ultimate feed mixture. Thus, cracked grain would be the primary ingredient. Minor ingredients are then added. Micro-ingredients are added last. These include vitamins, drugs, growth promoters, antibiotics, and, in the present case, natamycin. Thus, natamycin can be one of the micro-ingredients and is added to the feed in the final blending step. The feed is blended for conventional time periods.

The feed comprising the natamycin is fed to the flock at standard feed dosage ranges and rates. Based in the above amounts of natamycin contained in the feed, the dosage amount for each chicken or turkey per day would preferably be about 0.0008 grams to about 0.033 grams, and more preferably, about 0.0016 grams to about 0.0083 grams.

The advantageous properties of this invention can be observed by reference to the following examples that illustrate the invention. These examples are provided for the purposes of illustration and are not intended to limit the scope of the present invention.

EXAMPLES

Example 1

Evaluation of Natamycin in Feeds Formulated for Portion-Control Processed Broilers The natamycin test article was mixed into the basal diets according to the feed mixing SOP of Colorado Quality Research, Inc. (CQR), using a 4000 lb capacity mixer in a feed mill. Mixed feed was stored in 50 lb capacity feed sacks. Feed was stored by treatment and treatment diets were further identified with color-codes.

After each diet had been mixed, three composite samples (approximately 1 lb each) were collected. The amount of feed mixed for each treatment was as follows:

| | | |
|---|---|---|
| Starter Diet | Days 0-21 (crumbled) | 1500 lbs |
| Finisher diet | Days 21-32 (pelleted) | 2150 lbs |
| Withdrawal diet | Days 32-42 (pelleted) | 3200 lbs |

Normal, healthy day-old chicks were obtained from a commercial hatchery. Birds were transported from the hatchery location to Denver, Colo. via commercial air freight. Ground transportation was used to transport chicks from Denver to Wellington, Colo.

The study started with 1200 commercial broilers of the species *Gallus domesticus*, the birds being placed into pens (30 male/30 female per pen). Treatments were assigned to pens using randomized block design. The research facility was divided into 10 blocks of 2 pens each. Birds were assigned randomly according to CQR SOPs. Specific treatment groups are shown in Table 1 below.

TABLE 1

| Treatment | Description | lbs/ton Natamycin | No. of Pens | No. of Birds per Pen* | Total No. of Birds |
|---|---|---|---|---|---|
| 1 | Control | 0 | 10 | 58 | 580 |
| 2 | Natamycin | 1 | 10 | 58 | 580 |

*Approximately 2 extra chicks were initially placed in each pen to allow for chick mortality days 0-7. Birds were recounted at 7 days of age; it was desirable that each pen contain approximately 58 birds at this time. If needed, birds were moved from pen to pen of the same treatment group so that all pens started equal.

Feed was provided ad libitum throughout the study via two hanging 17-inch diameter tube feeders per pen. A chick feeder tray was also placed in each pen for approximately the first 6 days. All birds were placed on their respective treatment diets upon receipt (approx. 0 days of age). All feed added and removed from pens was weighed and recorded. All experimental diet changes were conducted at the same time for both treatment groups.
Results at 43 Days were as Follows:

TABLE 2

| Treatment Number | | Number of Birds | Breast Weight | % Breast |
|---|---|---|---|---|
| 1 | Treatment Total | 233 | 74.048 | — |
| 1 | Treatment Average | — | 0.318 | 21.81 |
| 2 | Treatment Total | 230 | 77.485 | — |
| 2 | Treatment Average | — | 0.337* | 22.83** |

*Statistically Very Significant
**Statistically Extremely Significant

As shown in Table 2 above, the addition of natamycin in the diets of broilers increased breast weight and breast yield over a 43 day period. Further, the increases in breast weight and yield were determined to be statistically significant.

Example 2

Evaluation of Natamycin in Feeds Formulated for Growing Large Broilers

The natamycin test article was mixed into the basal diets according to the feed mixing SOP of Colorado Quality Research, Inc. (CQR), using a 4000 lb capacity mixer in a feed mill. Mixed feed was stored in 50 lb capacity feed sacks. Feed was stored by treatment and treatment diets were further identified with color-codes.

After each diet had been mixed, three composite samples (approximately 1 lb each) were collected. The amount of feed mixed for each treatment was as follows:

| | | |
|---|---|---|
| Starter Diet | Days 0-19 (crumbled) | 1400 lbs |
| Finisher diet | Days 19-39 (pelleted) | 4000 lbs |
| Withdrawal diet | Days 39-60 (pelleted) | 5200 lbs |

Normal, healthy day-old chicks were obtained from a commercial hatchery. Birds were transported from the hatchery location to Denver, Colo. via commercial air freight. Ground transportation was used to transport chicks from Denver to Wellington, Colo.

The study started with 1400 commercial broilers of the species *Gallus domesticus*. Treatments were assigned to pens using randomized block design. The research facility was divided into 10 blocks of 2 pens each. Birds were assigned randomly according to CQR SOPs. Specific treatment groups are shown in Table 3 below

TABLE 3

| Treatment | Description | lbs/ton Natamycin | No. of Pens | No. of Birds per Pen* | Total No. of Birds |
|---|---|---|---|---|---|
| 1 | Control | 0 | 10 | 67 | 670 |
| 2 | Natamycin | 1 | 10 | 67 | 670 |

*Approximately 3 extra chicks were initially placed in each pen to allow for chick mortality days 0-7. Birds were recounted at 7 days of age; it was desirable that each pen contain approximately 67 birds at this time. If needed, birds were moved from pen to pen of the same treatment group so that all pens started equal.

Feed was provided ad libitum throughout the study via two hanging 17-inch diameter tube feeders per pen. A chick feeder tray was also placed in each pen for approximately the first 6 days. All birds were placed on their respective treatment diets upon receipt (approx. 0 days of age). All feed added and removed from pens was weighed and recorded. All experimental diet changes were conducted at the same time for both treatment groups.
Results at 61 Days were as Follows:

TABLE 4

| Treatment Number | | Number of Birds | Breast Weight | % Breast |
|---|---|---|---|---|
| 1 | Treatment Total | 265 | 129.973 | — |
| 1 | Treatment Average | — | 0.490 | 21.00 |
| 2 | Treatment Total | 230 | 141.840 | — |

TABLE 4-continued

| Treatment Number | | Number of Birds | Breast Weight | % Breast |
|---|---|---|---|---|
| 2 | Treatment Average | — | 0.505 | 21.72** |

**Statistically Extremely Significant

As shown in Table 4 above, the addition of natamycin in the diets of broilers increased breast weight and breast yield over a 61 day period. Further, the increase in breast yield was determined to be statistically significant. Statistics of breast weight increase was not calculated.

Example 3

Evaluation of Natamycin Feed Additive in Diets Manufactured Using a Gap Extender The natamycin test article was mixed into the treatment by the ConAgra Poultry Company. Once each diet had been mixed, three composite samples (approximately 1 lb each) were collected. The amount of feed mixed for each treatment was as follows:

| Starter Diet | Days 0-21 (crumbled) |
| Grower diet | Days 21-35 (pelleted) |
| Finisher diet | Days 35-42 (pelleted) |
| Withdrawal diet | Days 42-49 (pelleted) |

Normal, healthy day-old chicks were obtained from a commercial hatchery. Birds were transported from the hatchery location to Denver, Colo. via commercial air freight. Ground transportation was used to transport chicks from Denver to Wellington, Colo.

The study started with 1140 commercial broilers of the species *Gallus domesticus*. Treatments were assigned to pens using randomized block design. The research facility was divided into 10 blocks of 2 pens each. Birds were assigned randomly according to CQR SOPs. Specific treatment groups are shown in Table 5 below.

TABLE 5

| Treatment | Description | lbs/ton Natamycin | No. of Pens | No. of Birds per Pen* | Total No. of Birds |
|---|---|---|---|---|---|
| 1 | Control | 0 | 10 | 55 | 550 |
| 2 | Natamycin | 1 | 10 | 55 | 550 |

*A minimum of 2 extra chicks was initially placed in each pen to allow for chick mortality days 0-7. Birds were recounted at 7 days of age to 55 birds/pen. If needed, birds were moved from pen to pen of the same treatment group so that all pens started equal.

Feed was provided ad libitum throughout the study via two hanging 17-inch diameter tube feeders per pen. A chick feeder tray was also placed in each pen for approximately the first 6 days. All birds were placed on their respective treatment diets upon receipt (approx. 0 days of age). All feed added and removed from pens was weighed and recorded. All experimental diet changes were conducted at the same time for both treatment groups.

Results at 49 Days were as Follows:

TABLE 6

| Treatment Number | | Breast Weight | % Breast |
|---|---|---|---|
| 1 | Pen Average | 8.193 | 22.91 |
| 1 | Bird Average | 0.455 | — |
| 2 | Pen Average | 8.315 | 23.31* |
| 2 | Bird Average | 0.465 | — |

*Statistically Significant

As shown in Table 6 above, the addition of natamycin in the diets of broilers increased breast weight and breast yield over a 49 day period. Further, the increases in breast yield were determined to be statistically significant.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for increasing breast meat yield in an avian, the method comprising administering to the avian a breast meat yield-increasing amount of natamycin whereby the breast meat yield is increased by a statistically significant amount greater than the breast meat yield in an avian that has not been administered natamycin, and wherein the amount of natamycin comprises about 0.014 grams to 0.033 grams per avian per day over a 42-60 day period.

2. The method of claim 1 further comprising feeding the breast meat yield-increasing amount of natamycin to said avian.

3. The method of claim 1 wherein the avian is selected from the group consisting of poultry, turkeys, ducks and geese.

4. The method of claim 2 wherein the natamycin comprises a natamycin premix, said natamycin premix comprising at least one carrier.

5. The method of claim 4 wherein the natamycin premix comprises approximately 0.1-100 grams of natamycin per pound of carrier.

6. The method of claim 5 wherein the natamycin premix comprises approximately 0.5-50 grams of natamycin per pound of carrier.

7. The method of claim 6 wherein the natamycin premix comprises approximately 2-25 grams of natamycin per pound of carrier.

8. The method of claim 7 wherein the natamycin premix comprises approximately 10 grams of natamycin per pound of carrier.

9. The method of claim 4 wherein the carrier comprises calcium carbonate.

10. The method of claim 4 further comprises the step of adding an effective amount of the natamycin premix to a final feed.

11. The method of claim 10 wherein the effective amount of natamycin premix comprises approximately one pound of natamycin premix per one ton of final feed.

12. A method for increasing breast meat yield in an avian, the method comprising: a) obtaining a breast meat yield-enhancing amount of natamycin; b) mixing the breast meat yield-increasing amount of natamycin with a carrier to form a natamycin premix; c) blending an effective amount of natamycin premix with a feed to form a finished feed product; and d) feeding the finished feed product to said avian, whereby the breast meat yield is increased by a statistically significant amount greater than the breast meat yield in an avian that has not been administered natamycin, and wherein the amount of natamycin comprises about 0.014 grams to 0.033 grams per avian per day over a 42-60 day period.

13. The method of claim 12 wherein said carrier comprises calcium carbonate.

14. The method of claim 12 wherein the natamycin premix comprises approximately 0.1-100 grams of natamycin per pound of carrier.

15. The method of claim 14 wherein the natamycin premix comprises approximately 0.5-50 grams of natamycin per pound of carrier.

16. The method of claim 15 wherein the natamycin premix comprises approximately 2-25 grams of natamycin per pound of carrier.

17. The method of claim 16 wherein the natamycin premix comprises approximately 10 grams of natamycin per pound of carrier.

18. The method of claim 12 wherein the effective amount of natamycin premix comprises approximately one pound of natamycin premix per one ton of final feed.

* * * * *